(12) United States Patent
Jäger

(10) Patent No.: US 6,367,784 B1
(45) Date of Patent: Apr. 9, 2002

(54) APPARATUS FOR AERATING WATER

(75) Inventor: Andreas Jäger, Hannover (DE)

(73) Assignee: Gummi-Jäger KG GmbH & Cie (DE)

( * ) Notice: Subject to any disclaimer, the term of this patent is extended or adjusted under 35 U.S.C. 154(b) by 0 days.

(21) Appl. No.: 09/550,445

(22) Filed: Apr. 17, 2000

(51) Int. Cl.[7] ................................................. B01F 3/04
(52) U.S. Cl. .............. 261/122.2; 261/124; 261/DIG. 70
(58) Field of Search ........................... 261/122.1, 122.2, 261/124, DIG. 70; 210/220, 221.2

(56) References Cited

U.S. PATENT DOCUMENTS

| | | | | |
|---|---|---|---|---|
| 1,703,967 A | * | 3/1929 | Sperr, Jr. .................. | 261/122.1 |
| 1,717,713 A | * | 6/1929 | Logan ...................... | 261/122.1 |
| 3,432,154 A | * | 3/1969 | Danjes ..................... | 261/124 |
| 3,880,965 A | * | 4/1975 | Dudis et al. .............. | 261/122.1 |
| 4,029,581 A | * | 6/1977 | Clough, Jr. et al. ......... | 261/124 |
| 4,051,035 A | * | 9/1977 | Boschen et al. ............. | 261/124 |
| 4,488,508 A | * | 12/1984 | Heideman .................... | 261/124 |
| 5,160,460 A | * | 11/1992 | Goetz et al. ................. | 261/124 |
| 5,290,487 A | * | 3/1994 | Ludwig et al. .......... | 261/122.2 |
| 5,690,864 A | * | 11/1997 | Tyer ......................... | 261/122.1 |
| 5,851,447 A | * | 12/1998 | Tyer ......................... | 261/122.1 |

* cited by examiner

*Primary Examiner*—G. Scott Bushey
(74) *Attorney, Agent, or Firm*—R. W. Becker & Associates; R. W. Becker

(57) ABSTRACT

An apparatus for aerating water with fine bubbles is provided. At least one strip-like, inextensible aerating element is provided that has an air supply channel and there above a portion that is provided with slits which elastically widen under the effect of a supply of air. At least one holding element is secured to the base of a water reservoir that is to be aerated, wherein the aerating element is longitudinally displaceably held by the holding element such that with the reservoir filled, a pulling action on one end of the aerating element results in withdrawal thereof from the holding element.

16 Claims, 1 Drawing Sheet

APPARATUS FOR AERATING WATER

BACKGROUND OF THE INVENTION

The present invention relates to an apparatus for aerating water with fine bubbles, and includes at least one strip-like aerating element having an air supply channel and there above a wall that is provided with slits that elastically widen under the effect of supply of air, whereby the aerating element is secured against undesired lifting movements by means of holding means secured to the base of the water reservoir that is to be aerated.

With heretofore known apparatus of this type, the aerating elements are originally secured in the base region of the water reservoir. For this purpose, special anchoring means or fixedly installed tubular lines are provided via which the compressed air is supplied to the aerating elements. It is to be understood that if the aerating element becomes worn or damaged, special precautions must be taken in order to be able to replace the aerating element since repair is normally not possible on location. Rather, it is always necessary to first empty the water reservoir in order to even be able to disassemble the apparatus.

It is therefore an object of the present invention to be able to preclude the aforementioned drawbacks in a practical manner. In particular, disassembly and assembly should be capable of being carried out without having to lower the water level.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

The aerating apparatus of the present invention is characterized primarily in that the aerating element, which is inextensible, is longitudinally displaceably held by preferably a plurality of holding means in such a way that a pulling action on one end of the aerating element allows the entire aerating element to be pulled out of its holding means and, for example, to be replaced by a following, further aerating element. The pulling action, which is applied, for example, by a winch and by winding up the old aerating element, can, however, also be advantageous for both ends of the aerating element in order in this way to be able to keep the aerating element taut during the aerating operation. Furthermore, it is, however, also possible to equip the ends of the aerating element with inextensible cables or bands as extensions by means of which the aerating element can be pulled into or withdrawn from the operative position.

The holding means are advantageously holding elements that entirely or partially span or overlap the aerating elements, yet on those sides that face the aerating elements must be embodied in such a way that the desired relative movements are possible. For example, smooth, expediently convex guide surfaces or even cylindrical members can be provided that are also mounted so as to be rotatable. Furthermore, the holding means that span the aerating elements must also be embodied in such a way that (when the aerating elements are not subjected to an internal pressure) an adequate clearance exists between the holding means and the aerating elements so that during longitudinal displacement of the aerating elements binding of the aerating elements and excessive frictional resistance are precluded.

Further specific features of the present invention will be provided in detail subsequently.

DESCRIPTION OF PREFERRED EMBODIMENTS

Figure 1:
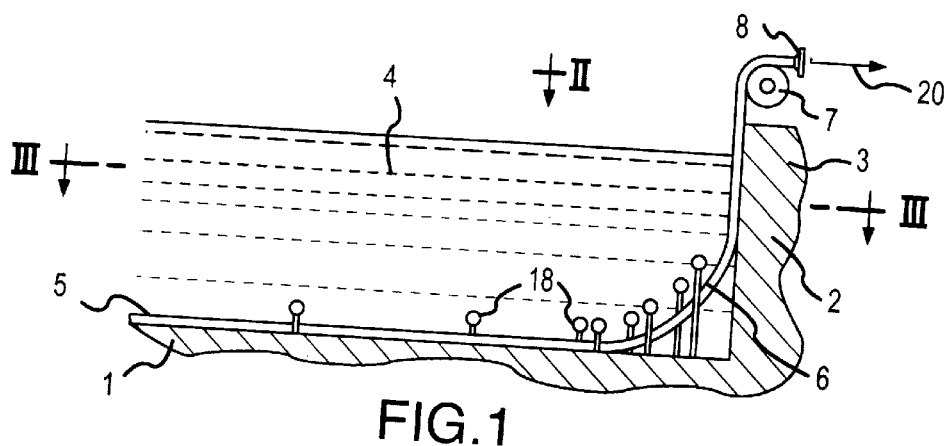
FIG. 1 is a partial cross-sectional view through a water reservoir that is to be aerated showing one exemplary embodiment of the inventive apparatus.

Referring now to the drawing in detail, disposed within a water tank or reservoir, which has a base 1, side walls 2, an outer edge 3, and a water fill 4, are a plurality of aerating elements 5 that are combined in pairs and extend parallel to one another. The aerating elements 5, which extend over the greatest portion of the width of the reservoir, rest upon the base 1 and at both sides of the reservoir extend vertically upwardly after passing through a curved section 6. At the outer edge 3, the aerating elements 5 are guided outwardly and to the side over a roller 7, which could be driveable. The aerating elements are here provided with a coupling 8 to which a compressed air line could be connected. Only one edge of the water reservoir is illustrated in FIG. 1. The opposite edge could have the same or similar configuration, or it would also be possible to eliminate the curved section 6 and/or the vertically upwardly directed portion.

The strip-like aerating elements 5 comprise a lower strip 9, an upper strip 10, and edge members 11 by means of which the parts 9, 10 merge with one another as a single piece. The components 9, 10 and 11 are made of rubber or some other elastomeric material. In order to make the aerating elements 5 tension proof, the edge members 11 have embedded therein inextensible cables 12. It would also be possible to achieve the tensile strength and possibly also transverse rigidity via other reinforcing inserts, such as fabric inserts in the lower strip 9. The important thing is that the upper strip 10 is provided with continuous slits that permit the desired aeration of the water fill with fine bubbles. In this connection, the compressed air is introduced into the space 13 between the two strips 9, 10, with the space 13 serving as an air supply channel. The air widens the slits so that the fine air bubbles can be discharged. It is to be understood that the upper strip 10 is provided with slits only in that longitudinal portion of the aerating elements 5 that are directly proximate to the base 1. In the end portions, the aerating elements 5 thus serve only for the supply of air to the longitudinal sections that are provided with slits.

Figure 2:
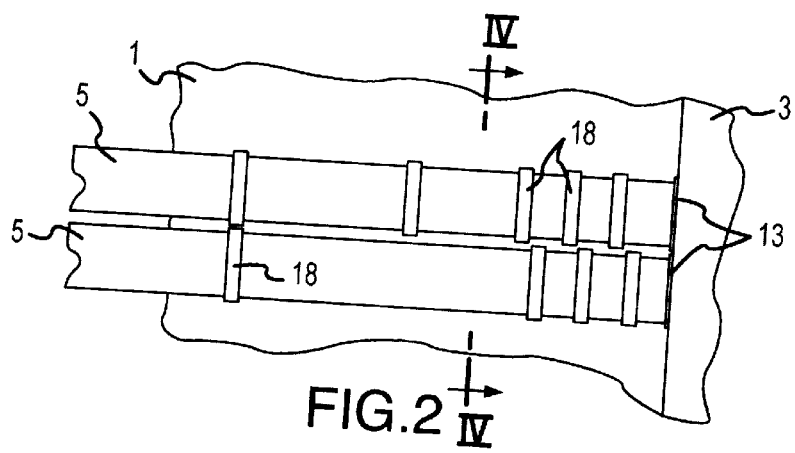
FIG. 2 is a partial plan view of the reservoir portion of FIG. 1 taken in the direction of the arrow 11.
Figure 3:
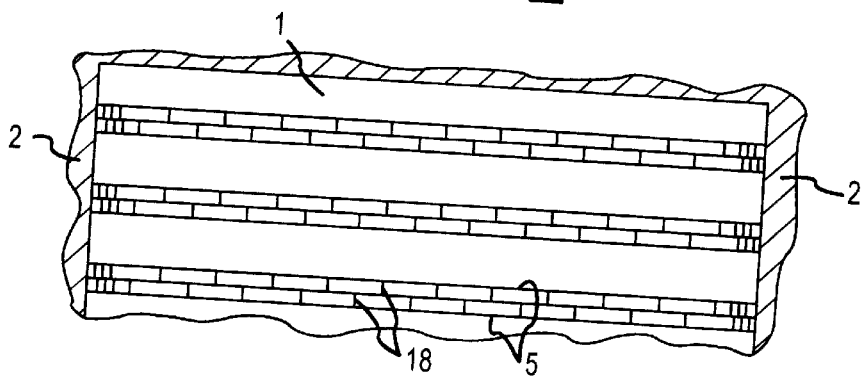
FIG. 3 is a cross-sectional view taken in the direction of the line III—III in FIG. 1.
Figure 4:
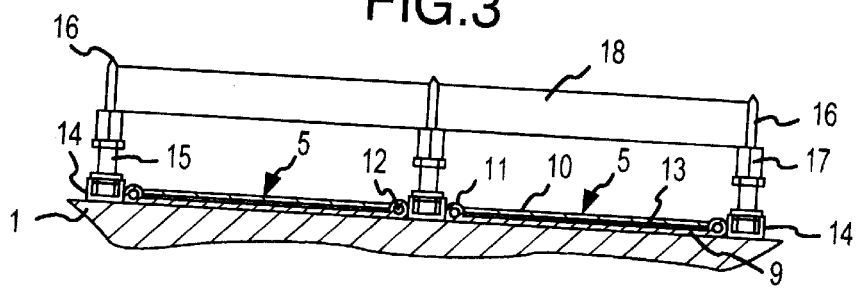
FIG. 4 is a partial cross-sectional view taken along the line IV—IV in FIG. 2.

A critical feature is the mounting means for the aerating elements 5 in order to ensure their position in the various longitudinal sections of FIGS. 1 to 3. For this purpose, secured to the base 1 are hollow or U rails 14, which serve to engage the heads of vertically upright bolts 15 on which are threaded in a height adjustable manner, nuts 17 that at the top are provided with an eye 16. These eyes serve for holding horizontal pipes 18 against the bottom of which rest the aerating elements 5 when they expand with internal pressure. The pipes 18 can also be mounted so as to be rotatable. In any case, the pipes 18 must be disposed with clearance above the aerating elements 5, which clearance is readily reduced or eliminated when the aerating elements 5 expand.

Since the aerating elements 5 are disposed in pairs, the pipes 18 of adjacent aerating elements 5 are offset relative to one another. In addition, the holding means in the vicinity of the curved sections 6 are installed at varying heights (see, for example, FIG. 1). Furthermore, the spacing of the holding means from one another is such that the aerating elements 5 can bulge upwardly only slightly between successive mounting means.

The pulling effect in the direction of the arrow 20 furthermore has the advantage that the aerating elements 5 can also be kept under tension during aeration.

The inventive mounting of the inextensible aerating elements 5 enables a longitudinal displacement thereof. By means of a pulling effect in the direction of the arrow 20, each of the aerating elements 5 can be withdrawn from the water reservoir without for this purpose having to empty the water reservoir to thereby preclude undesired bulging between the mounting means. Along with the withdrawal of an aerating element 5, another aerating element can be installed by connecting the front end thereof with the back end of the aerating element 5 that is to be removed. In this connection, the aerating element 5 that is to be removed serves as an auxiliary aid for drawing in or inserting a new element.

In the region of the curved sections 6 to the connections or couplings 8, the aerating elements 5 are embodied merely as pulling members with which, however, compressed air feed lines are preferably associated in order to ensure the supply of compressed air. The pulling members can, for example, be embodied as bands or cables.

It is often advantageous to associate an air supply connection to both ends of an aerating element 5 in order to improve the uniformity of the aeration over the length of the element.

The present invention is, of course, in no way restricted to the specific disclosure of the specification and drawings, but also encompasses any modifications within the scope of the appended claims.

What is claim is:

1. An apparatus for aerating water with fine bubbles comprising:
   at least one strip-type, inextensible aerating element having an air supply channel and there above a portion that is provided with slits which elastically widen under the effect of a supply of air; and
   at least one holding means secured to a base of a water reservoir that is to be aerated, wherein said at least one aerating element is longitudinally diplaceably held by said holding means such that with said water reservoir filled, a pulling action on one end of said at least one aerating element allows withdrawal of said aerating element from said holding means, and wherein said at least one aerating element, at an end thereof opposite said one end, is provided with fastening means for pulling another one of said at least one aerating element after said aerating element that is being withdrawn.

2. An apparatus according to claim 1, which includes a plurality of holding means.

3. An apparatus according to claim 1, wherein opposite ends of said at least one aerating element are provided with at least one of a compressed air connection and means suitable for transferring pulling action.

4. An apparatus according to claim 1, wherein at least said one end of said at least one aerating element is guided out of said water reservoir and in a region of a reservoir edge is associated with a deflection means.

5. An apparatus according to claim 4, wherein said deflection means is in the form of a roller onto which said at least one aerating element is wound or by means of which said aerating element is guided.

6. An apparatus according to claim 1, which includes a plurality of said aerating elements disposed in pairs and parallel to one another.

7. An apparatus according to claim 1, wherein said at least one holding means comprises components that at least partially span said at least one aerating element and are disposed with clearance over said at least one aerating element when the latter is not pressurized.

8. An apparatus according to claim 7, wherein sides of said components that face said at least one aerating element are rounded or convex.

9. An apparatus according to claim 8, wherein said components are part of a rotatable roller.

10. An apparatus according to claim 7, wherein said components are adjustable in height.

11. An apparatus according to claim 1, wherein only portions of at least one aerating element that are disposed horizontally on said base of said water reservoir are provided with slitted portions that are suitable for the discharge of air bubbles.

12. An apparatus according to claim 1, wherein said at least one aerating element, when in a state of rest and hence not pressurized, has an essentially flat rectangular configuration, an d is comprised of an elastomer, and wherein said at least one aerating element is proyided with reinforcing inserts to make it inextensible.

13. An apparatus according to claim 1, wherein a plurality of parallel aerating elements are provided, and wherein each of said aerating elements is provided with its own compressed air connection that is provided with a shutoff device.

14. An apparatus according to claim 5, wherein said roller is driveable.

15. An apparatus according to claim 12, wherein said reinforcing inserts also make said at least one aerating element transversely rigid.

16. An apparatus for aerating water with fine bubbles comprising:
   at least one strip-type, inextensible aerating element having an air supply channel and there above a portion that is provided with slits which elastically widen under the effect of a supply of air; and
   at least one holding means secured to a base of a water reservoir that is to be aerated, wherein said at least one aerating element is longitudinally diplaceably held by said holding means such that with said water reservoir filled, a pulling action on one end of said at least one aerating element allows withdrawal of said aerating element from said holding means, wherein said at least one holding means comprises components that at least partially span said at least one aerating element and are disposed with clearance over said at least one aerating element when the latter is not pressurized, and wherein said components are adjustable in height.

* * * * *